(12) United States Patent
Campbell-Lee et al.

(10) Patent No.: US 11,266,144 B2
(45) Date of Patent: Mar. 8, 2022

(54) BIOFILM TARGETING MICROCAPSULE CARRYING A NON-VOLATILE FUNCTIONAL MATERIAL

(71) Applicant: Conopco, Inc., Englewood Cliffs, NJ (US)

(72) Inventors: Stuart Campbell-Lee, Wirral (GB); Katherine Mary Thompson, Wirral (GB)

(73) Assignee: Conopco, Inc., Englewood Cliffs, NJ (US)

( * ) Notice: Subject to any disclaimer, the term of this patent is extended or adjusted under 35 U.S.C. 154(b) by 343 days.

(21) Appl. No.: 16/475,206

(22) PCT Filed: Dec. 20, 2017

(86) PCT No.: PCT/EP2017/083916
§ 371 (c)(1),
(2) Date: Jul. 1, 2019

(87) PCT Pub. No.: WO2018/130395
PCT Pub. Date: Jul. 19, 2018

(65) Prior Publication Data
US 2019/0343117 A1  Nov. 14, 2019

(30) Foreign Application Priority Data
Jan. 10, 2017 (EP) .................................... 17150834

(51) Int. Cl.
*A01N 25/28* (2006.01)
*A01N 25/10* (2006.01)

(52) U.S. Cl.
CPC ............. *A01N 25/28* (2013.01); *A01N 25/10* (2013.01)

(58) Field of Classification Search
None
See application file for complete search history.

(56) References Cited

U.S. PATENT DOCUMENTS

| | | | |
|---|---|---|---|
| 5,169,754 | A | 12/1992 | Siiman et al. |
| 5,824,929 | A | 10/1998 | Carr et al. |
| 7,824,557 | B2 | 11/2010 | Whitekettle et al. |
| 8,211,452 | B2 | 3/2012 | Miksa et al. |
| 8,697,375 | B2 | 4/2014 | Shirtliff et al. |
| 9,440,869 | B2 | 9/2016 | Edmiston et al. |
| 2007/0104660 | A1 | 5/2007 | Miksa et al. |
| 2009/0199314 | A1 | 8/2009 | Gaudillat |
| 2010/0239650 | A1 | 9/2010 | Whitekettle et al. |
| 2013/0210697 | A1 | 8/2013 | Ferguson et al. |
| 2014/0206587 | A1 | 7/2014 | Chen et al. |
| 2014/0213499 | A1 | 7/2014 | Chen et al. |
| 2015/0328241 | A1 | 11/2015 | Hilliard et al. |

FOREIGN PATENT DOCUMENTS

| | | | |
|---|---|---|---|
| CN | 101336287 | 12/2008 | |
| CN | 101355922 | 1/2009 | |
| CN | 101400257 | 4/2009 | |
| EP | 3130657 | 2/2017 | |
| JP | 61155307 | 7/1986 | |
| WO | WO9015596 | 12/1990 | |
| WO | WO9936470 | 7/1999 | |
| WO | WO-9936470 A1 * | 7/1999 | ........... C08B 37/009 |
| WO | WO0016623 | 3/2000 | |
| WO | WO2011020652 | 2/2001 | |
| WO | WO2007062666 | 6/2007 | |
| WO | WO2007062833 | 6/2007 | |
| WO | WO2009037060 | 3/2009 | |
| WO | WO2011085224 | 7/2011 | |
| WO | WO2013026181 | 2/2013 | |
| WO | WO2013107586 | 7/2013 | |
| WO | WO2015193302 | 12/2015 | |
| WO | WO2016183033 | 11/2016 | |
| WO | WO2012022736 | 7/2018 | |

OTHER PUBLICATIONS

Dionisio et al. (Locust bean gum: Exploring its potential for biopharmaceutical applications, J Pharm Bioallied Sci Jul.-Sep. 2012; 4(3):175-185). (Year: 2012).*
Sanyasi, et al,; Polysaccharide-capped silver Nanoparticles inhibit biofilm formation and eliminate multi-drug-resistant bacteria b distrupting bacteria by distrupting bacterial cytoskeleton with reduced cytotoxicity towards mammalian cells; Scientific Reports; 2016; pp. 1-6 (XP55709990); vol. 6(1).
De Cicco, et al.; Carbohydrate Polymers, In Situ forming antibacterial dextran blend hydrogel for wound dressing: SAA technology vs. spray drying; .; 2014; pp. 1216-1224; 101.
Ferreira et al.; Activity of daptomycin- and vancomycin-loaded poly-epsilon-caprolactone microparticles against mature staphylococcal biofilms; Intl Journal of Nanomedicine; 2015; pp. 4351-4366; 10.
Search Report and Written Opinion in PCTEP2017083916; dated Feb. 2, 2018.
Search Report and Written Opinion in EP1750834; dated Mar. 20, 2017.
Search Report and Written Opinion in EP17150854; dated Jun. 27, 2017.
Search Report and Written Opinion in PCTEP2018050072; dated Mar. 13, 2018.
Written Opinion in PCTEP2018050072; dated Dec. 10, 2018.
IPRP in PCTEP2018050072; dated Mar. 22, 2019.
Camporotondi, D.E et al. Edited by A. Méndez-Vilas. ; Antimicrobial properties of silica modified nanoparticles; Microbial Pathogens and Strategies for Combating Them: Science, Technology and Education; Jan. 2013; pp. 283-290; Formatex.

* cited by examiner

*Primary Examiner* — Melissa S Mercier
(74) *Attorney, Agent, or Firm* — Greenberg Traurig, LLP

(57) ABSTRACT

A biofilm targeting microcapsule, suitable for deposition onto a biofilm from an aqueous dispersion, comprising a solid microparticle with average diameter from 1 to 100 micron, the microparticle carrying a non-volatile functional material to be delivered to the biofilm after the microparticle has been deposited onto the biofilm, characterised in that the microparticle has attached to its outer surface from 0.5 to 5 wt %, based on the microparticle weight, of nonionic polysaccharide polymer.

10 Claims, No Drawings

BIOFILM TARGETING MICROCAPSULE CARRYING A NON-VOLATILE FUNCTIONAL MATERIAL

TECHNICAL FIELD

This invention relates to biofilm targeting microcapsules carrying non-volatile functional materials, also to methods of contacting biofilm with such biofilm targeting microcapsules and to use of deposition aids to increase the deposition of such microcapsules onto biofilm. The biofilms of interest are found on surfaces, for example, as parts of a laundry washing machine or parts of a WC, especially the bowl. In particular it relates to deposition of microcapsules modified with a deposition aid onto the biofilm on the surface during a low temperature, short contact time dynamic flow process. Such processes are exemplified by the wash cycle of an automatic washing machine and by flushing of a WC.

BACKGROUND

Short laundry wash cycles, low wash temperatures and use of laundry liquid detergents, in preference to powder detergents containing biocidal bleaching agents, all contribute to increased microbial contamination of washing machines; principally in the form of biofilms. Biofilms can also form on toilet bowls, especially in conjunction with lime scale deposits.

Biofilms comprise micro-organisms (bacteria and fungi) found on surfaces and a layer of protective slime exuded by the microorganisms. This slime is sometimes termed "extracellular polymeric, or exopolymeric, substance" or EPS. It principally consists of water structured by a mixture of proteins and polysaccharides, together with DNA and small molecules. The EPS is very viscous and is highly effective in helping to prevent the micro-organisms from being rinsed away, or drying out; protecting micro-organisms from dehydration and hygiene products. Biofilms have water filled channels which allow transport of nutrients deep into their structures.

Biofilms can form visibly around the door seal of a washing machine. They also form on surfaces that consumers cannot see or readily access to clean thoroughly. For example: around the inside of the drum and internal pipes and drums of a washing machine.

Biofilms are implicated in the development of laundry malodour; not only affecting the washing machine itself, but also the clothes which may then have to be re-washed. Globally there is increasing awareness of this problem by consumers. Biofilms may also pose health risks for some consumers. Inhalation of microbe contaminated water droplets from washing machines has been linked to a risk of pulmonary infections for cystic fibrosis patients. Biofilms on WC bowls are less of a health concern but they can make limescale removal more difficult and that is in itself a problem.

Non-volatile functional materials may be chosen that when deposited onto a biofilm serve to provide a visual indication of its presence and/or act on the biofilm to control it in some way. It is a problem to deposit many of these non-volatile functional materials from aqueous media that flow rapidly past the biofilm for relatively short periods of time. Both laundry washing machines and WCs provide only a short contact time between a non-volatile functional material such as a biofilm control agent and the biofilm, and the contact time is truncated when the liquor is rinsed away. Furthermore, many otherwise useful and effective biofilm control agents are not compatible with cleaning product formulations and would be deactivated by interactions with other formulation ingredients. For example, cationic materials complex with anionic detergents and this complexation can significantly reduce their antimicrobial potency. Oxidising materials can show poor stability due to unwanted side reactions with formulation ingredients and materials present as ingredient impurities.

Patent documents from other fields appear to suggest that particles without special deposition aids may provide an acceptable level of deposition of non-volatile functional materials onto biofilms. Mainly, these documents relate to different systems where contact times are orders of magnitude longer than typical in laundry washing machines or WC flushes. We believe that, either the described microcapsules are unstable in the required concentrated treatment composition potentially useful for delivery of the microcapsules to a washing machine, or else the level of deposition obtained would be insufficient to deliver a real benefit given the short contact time.

U.S. Pat. No. 7,824,557 (General Electric Company) describes delivery of biocides to biofilm using liposome vesicles. The focus is on preventing fouling of industrial microfiltration systems. According to their own disclosure the liposomes are stable for days at most. This would make them completely unsuited to use in a liquid laundry composition in the presence of surfactant. No delivery aid is suggested. It is suggested that providing further layers on the liposomes might improve stability and/or provide controlled release. The liposomes are chosen due to their compatibility with biofilm material so no deposition aid would be needed for the format exemplified.

WO 00/16623 (Phycogen Inc) describes the use of biocides embedded in a silicone coating to control fouling by biofilm. Although not tested it is taught on page 17 line 24 that silicone polymers may be used to form a microencapsulated variant of the system. This disclosure makes no teaching that could be considered as saying that the untested microcapsule variant would be suitable for solving the problem of rapid dynamic deposition such as from a diluted laundry composition in a washing machine. The static nature of antifouling agents, which are directly applied to the surface to be protected from biofilm, means that it is unnecessary to target the microcapsules to biofilm.

U.S. Pat. No. 5,824,292 (Quest) discloses coating of a latex bead to improve its deposition to oral plaque. The coating is formed of a targeting polymer which either contains carbohydrate structures specifically recognised by bacterial adhesins (e.g. lectins) or else contains antibodies which recognise oral plaque bacterial antigens. These particles are used in a mouthwash to control plaque bacterial numbers. Preferred targeting polymers are milk glycoproteins selected from (asialo)-kappa-casein, sweet whey, asialofetuin and mixtures thereof. Dextrans are also disclosed. Exemplary particles were poly(styrene) latex particles. Oral plaque is principally formed by Gram positive *Streptococcus* bacteria such as *S. mutans* and *S. sangui*. *Pseudomonas aeruginosa*, a Gram negative bacterium, has been identified in domestic washing machine biofilm isolates and is believed to be a key organism involved in biofilm formation. Because of the different causative organism and different nutrient supplies, the composition of oral plaque matrix is different from laundry and other home care biofilms.

U.S. Pat. No. 5,169,754 (Coulter Corp) discloses colloidal particles with a solid core coated with two layers of cross-linked water soluble gelatin which is coated with covalently attached pendent functional groups. The solid core is preferably polystyrene or magnetite and the gelatin is crosslinked with glutaraldehyde. The pendant "biological substances" may be amino groups, sulfhydryl and maleimidyl groups but preferably proteins and specific monoclonal antibodies. The particles are designed for use in biological (e.g. immuno-) assays. The patent further claims a process for preparing the functionalised particles via an EDAC coupling route.

U.S. Pat. No. 8,697,375 B2 (University of Maryland and Arizona Board of Regents) discloses a method for in vivo detection (magnetic resonance imaging) of Staphylococci biofilm infection comprising a paramagnetic nanoparticle covalently bound to a biofilm specific probe, where the probe is preferably an antibody.

Use of antibodies to target biofilm in a laundry washing machine is believed to suffer from several disadvantages:

i) Antibody-antigen binding is highly specific so a range of antibodies would probably need to be developed to give a broad spectrum benefit and there is the risk of the recognition systems becoming less effective if the microbial system evolves (development of "resistance" mechanisms);
ii) Antibody targeting technology is expensive;
iii) Antibodies, in common with many proteins, can become denatured by surfactants, complicating the incorporation of antibody and protein tagged particles into detergent based formulations;
iv) Use of antibody proteins in home and personal care products may also give rise to safety concerns (risks of consumer sensitisation etc);
v) Antibody deposition aids are degraded by protease enzymes, limiting the scope for their inclusion in enzyme containing "biological" laundry detergent products; and
vi) The antibody targeting approach typically requires the particle to see the bacterial cell surface in order to recognise specific surface bound proteins. The cells in Home Care biofilms are covered in EPS, which could prevent the antibodies from interacting with and recognising the underlying cells.

For all these reasons, the skilled worker wishes to avoid the use of antibody targeting systems for delivery of microcapsules to biofilm in a home care applications such as laundry washing machines.

Nonionic polysaccharides, in particular xyloglucans, have been disclosed as deposition aids for deposition of microcapsules onto fabric during a laundry washing process; also onto other substrates, such as: hair and skin. These microcapsules are primarily taught as a means to enhance or modify perfume delivery to fabrics. There has been no suggestion to use polysaccharide modified microcapsules to deliver non-volatile functional materials such as biofilm control agents to biofilm.

SUMMARY OF THE INVENTION

According to a first aspect of the present invention there is provided a biofilm targeting microcapsule, suitable for deposition onto a biofilm from an aqueous dispersion, comprising a solid microparticle with average diameter from 1 to 100 micron, the microparticle carrying a non-volatile functional material to be delivered to the biofilm after the microparticle has been deposited onto the biofilm characterised in that the microparticle has attached to its outer surface from 0.5 to 5 wt %, based on the microparticle weight, of nonionic polysaccharide polymer.

In one embodiment the microcapsule comprises a solid latex core of synthetic polymer and the non-volatile functional material is adsorbed into the solid latex core.

In another embodiment the non-volatile functional material is carried in a swellable silica microparticle as described below. Such an embodiment has the advantage that the non-volatile material can be loaded into the microparticle after manufacture of the microparticle.

According to a second aspect of the invention there is provided a method of delivering a non-volatile functional material to a biofilm comprising the steps of:
a) forming an aqueous dispersion of microcapsules according to the first aspect of the invention,
b) flowing the aqueous dispersion across the biofilm for a time of from 3 seconds to 30 minutes, thereby to bring the microcapsules into contact with the biofilm and to leave them adhered to the biofilm.

Preferably the contact time is from 30 seconds to 15 minutes, more preferably 1 minute to 5 minutes.

In this method the microcapsules according to the first aspect do not easily get rinsed off and can slowly release a biofilm control agent close to the microbes, boosting performance. The improved performance resulting from targeting delivery allows lower concentrations of these biofilm control agents to be used within a formulation, resulting in lower cost, less waste and hence an improved environmental profile.

According to a third aspect of the invention there is provided use of nonionic polysaccharide polymer attached to the surface of microcapsules with average diameter from 1 to 100 micron to increase the delivery, from an aqueous dispersion of the microcapsules, of non-volatile functional material carried by the microcapsule, to a biofilm, the nonionic polysaccharide polymer comprising from 0.5 to 5 wt % of the weight of each microcapsule.

DETAILED DESCRIPTION OF THE INVENTION

The Non-Volatile Functional Material

In this specification a non-volatile functional material is one that does not volatilise too much. A perfume is not non-volatile. When applied to a surface and left at 25° C. a non-volatile material will lose less than 50% of its mass over a time of 7 days. A non-volatile functional material typically has a boiling point greater than 250° C.

This can be anything that is non-volatile and fulfils a function when delivered to a biofilm. It may be a dye that shows up the presence of biofilm. It may be a biofilm control agent or mixture of such biofilm control agents. Among dyes the hydrophobic dyes are preferred.

It is preferred that the level of non-volatile functional material in the microcapsule is at least 0.5 wt % based on the weight of the microcapsule, more preferably at least 5 wt % and most preferably at least 20 wt %. The upper limit is determined by the type of non-volatile material and the type of microcapsule. It could be as high as 50 wt % even as high as 80 wt % or more.

Preferably, the non-volatile functional material comprises an antimicrobial active or mixture of antimicrobial actives intended to kill or inhibit microbial growth, or a biofilm dispersing agent, or a quorum sensing inhibitor, or mixtures of materials having one or more of these functions.

The biofilm control agent is advantageously water-soluble, or essentially water-insoluble, but oil soluble. Biofilms contain natural surfactants (rhamnolipids) which are likely to help solubilise oily materials.

The biofilm control agent is preferably selected from one or more of the following classes of materials:

(a) Quaternary ammonium compounds (QACs): Preferred compounds are benzalkonium chlorides (BKC), mono-alkyl trimethyl ammonium salts, for example hexadecyltrimethyl ammonium chloride (CTAC), di(C6-C14)alkyl di-short chain (C1-4 alkyl and/or hydroxyalkyl) quaternaries and cetylpyridinium chloride;

(b) Biguanide compounds. Preferred compounds are 1,1'-hexamethylene bis(5-(p-chlorophenyl)biguanide), commonly known as chlorhexidine, including poly(hexamethylene biguanide) hydrochloride and poly(hexamethylene biguanide) stearate;

(c) Phenols. Preferred compounds are ortho-phenylphenol, 2,4,4'-trichloro-2'-hydroxy-diphenyl ether (Triclosan), 4-4' dichloro-2-hydroxy diphenyl ether (Diclosan), para-chloro-meta-xylenol (PCMX), thymol, chlorothymol;

(d) Fugicidal and fungistatic actives. Preferred actives are climbazole, ketoconazole, and zinc pyrithione; and (e) Biofilm dispersing agents or quorum sensing inhibitors. Preferred biofilm dispersing agents and quorum sensing inhibitors are furanones and lactams as described in WO 2007/085042.

BKC is incompatible with anionic surfactant in the composition and so it is necessary to add it in a separate composition when it is used to treat biofilm during a washing process. Encapsulating it in a controlled or delayed release microcapsule form whereby it is deposited to the biofilm and the BKC is only released after the surfactant has been rinsed away overcomes this problem.

Biofilm control agents with a pKa in the range 8 to 11 that would encompass phenols (e.g. Diclosan, pKa ca. 8.1, thymol, pKa 10.6), but exclude aliphatic alcohols (pKa>>12) are preferred.

Encapsulated biofilm control agents offer more flexibility in terms of product format than unencapsulated materials, in terms of allowing incompatible and unstable materials to be used. For example "cationic biocides", which form one the most important classes of current regulatory approved biofilm control agents, only perform effectively in the absence of anionic detergent ingredients required for effective cleaning performance. Thus in a laundry context they can be delivered from fabric conditioners but not from main wash detergent products that typically contain high levels of anionic surfactants. Encapsulation overcomes this problem by isolating the cationic biocide from the anionic detergent until a delayed release time when the anionic detergent will have been rinsed away.

The Nonionic Polysaccharide

Suitably the non-ionic polysaccharide polymer is covalently attached to the outer surface of the microcapsule.

The nonionic polysaccharide polymer may be selected from the group consisting of branched and unbranched materials having a β-1,4-backbone and of branched and unbranched materials having a β-1,3-linked backbone.

Preferably the nonionic polysaccharide polymer consists of β-1,4-polysaccharides comprising one or more of xyloglucan, locust bean gum and mixtures thereof. Alternatively, or additionally, the nonionic polysaccharide polymer consists consist of β-1,3-polysaccharides comprising one or more of scleroglucan (schizophyllan), laminarin and mixtures thereof. Relevant microbial EPS components include high levels of β-1,3 polysaccharides as well asp-1,4 polysaccharides. Preferably, the nonionic polysaccharide does not include any alpha- or alpha-(1,6) linked polysaccharides. This excludes starch and pullulan, as well as dextran.

The molecular weight of the nonionic polysaccharide polymer preferably falls in the range 40 kDa to 1 MDa.

Without wishing to be bound by theory it is thought that the presence of the nonionic polysaccharide deposition aid also prevents unwanted aggregation of the particles in storage and in use by means of steric effects.

The Microcapsules

The microcapsules may be selected to be any suitable relatively rigid solid microparticles that can carry a desired non-volatile functional material. Core shell microcapsules may be adapted to this purpose.

Preferred microcapsules are latex microcapsules as described herein.

Another type of latex microcapsule is described in WO2012/007438 or WO2015/181027.

Another suitable type of microcapsule is a swellable silica microparticle porous microparticles comprising sol-gel derived material, the sol-gel derived material including a plurality of alkylsiloxy substituents and wherein the sol-gel derived material is obtained from:

(a) at least one first alkoxysilane precursor having the formula:

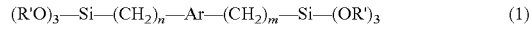

$$(R'O)_3-Si-(CH_2)_n-Ar-(CH_2)_m-Si-(OR')_3 \qquad (1)$$

where n and m are individually an integer from 1 to 8, Ar is a single-, fused-, or poly-aromatic ring, and each R' is independently a $C_1$ to $C_5$ alkyl group and (b) optionally, at least one second precursor having the formula:

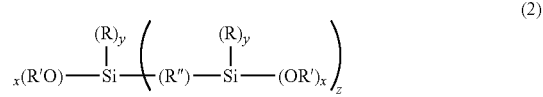

$$_x(R'O)-\underset{\underset{Si}{|}}{\overset{(R)_y}{|}}-\left(-(R'')-\underset{\underset{Si}{|}}{\overset{(R)_y}{|}}-(OR')_x\right)_z \qquad (2)$$

where x is 1, 2, 3 or 4; y is 0, 1, 2, 3; z is 0, 1; the total of x+y+z is 4; each R is independently an organic functional group; each an R' is independently a $C_1$ to $C_5$ alkyl group and R" is an organic bridging group, where the sol-gel derived material is swellable to at least 2.5 times its dry mass, when placed in excess acetone.

Typical synthetic methods for the sol-gel derived microparticles can be found in Chem. Mater. 2008, 20, 1312-1321; and U.S. Pat. No. 8,367,793 B2.

Suitable silica sol gel derived microparticles are available as porous sol gel materials from ABS Materials Inc., Wooster, Ohio under the tradenames of Osorb™ or SilaFresh™ Osorb media has a microporous morphology in the dry state whereas SilaFresh™ media has a mesoporous structure. Neither product adsorbs water. The sol-gels can further be derivatised with non-ionic deposition aids that are grafted by covalently bonding to the surface of the sol-gel using adaptations of methods previously disclosed and known to the skilled worker. The inclusion of deposition aids is particularly advantageous for delivery from laundry detergents and other perfumed products useful for treating laundry.

The sol-gel derived microparticle composition can be similar or identical to the swellable materials described in US2007/0112242 A1. For example, the sol-gel composition can include a plurality of flexibly tethered and interconnected organosilica particles having diameters on the nanometer scale. The plurality of interconnected organosilica particles can form a disorganized microporous array or matrix defined by a plurality of cross-linked aromatic siloxanes. The organosilica particles can have a multilayer configuration comprising a hydrophilic inner layer and a hydrophobic, aromatic-rich outer layer.

Advantageously, for optimum penetration of the biofilm and improved delivery of the biofilm control agent the microcapsules have average diameters in the range 1 to 50 micron, even with diameters in the range 1 to 20 microns. The small size ensures that the particles remain bound to the biofilm even if the deposition aid polymer is subsequently degraded by action of cellulase type enzymes from the biofilm. In another embodiment the microcapsules have a range of diameters of from as low as sub-micron to 50 micron. It is believed that the different diameter microcapsules penetrate and lodge in different sized channels in the biofilm, thus improving the delivery to different types and different areas of biofilm.

Various release mechanisms may be used to deliver non-volatile functional materials such as biofilm control agents to the biofilm after deposition has taken place. Mechanisms that may be used and would be familiar to the worker skilled in manufacture of microcapsules include: moisture, heat, and acid sensitive coatings. Coatings that degrade on exposure to enzymes and/or surfactants present in the biofilm are preferred.

A coating may also be needed to reduce leaching out into the water if the non-volatile functional material is water soluble.

The skilled person is aware of generally suitable processes to coat microcapsules. Preferred coatings are selected from the group comprising a second poly(acrylate), a poly (ester) a poly(amide), a protein and a polysaccharide. When used the coating thickness is preferably from 10 to 40 nm and contributes from 10 to 30% of the microcapsule radius.

The grafting of nonionic polysaccharides to microcapsules is described, for example, in WO2008/145547 and in WO2016/177607 for Polyurea shell material. Grafting to polystyrene latex is described herein.

Compositions Comprising the Microcapsules

The microcapsules can be added to conventional laundry washing or fabric softening compositions or can be used in specialist compositions designed to treat biofilm. When added to liquid compositions they can be in the form of a slurry or concentrated dispersion of the microcapsules in water, typically around 30% solids.

The technology is also relevant to adjunct products, such as washing machine cleaners, if they contain materials antagonistic to the biocidel active and the benefit of the particles becoming trapped in the biofilm will pertain even if there are no antagonistic materials in the formulation exterior to the microcapsule.

Compositions comprising the microcapsules are preferably aqueous and advantageously comprise at most 10 wt % of the microcapsules. The compositions may further comprise perfume microcapsules and desirably also contain free oil perfume. Compositions may further comprise detergent surfactants, polymers, dyes or colorants, and possibly enzymes provided they do not interact unfavourably with the microcapsules.

The invention will now be further described with reference to the following non-limiting examples.

EXAMPLES

Example 1: Deposition of Fluorescently Labelled Polystyrene Particles to Microbial Biofilm Red fluorescent 5.0+/−0.1 micron diameter poly(styrene) microsphere particles (Cat #PSFR005UM) were purchased from Magsphere Inc., (Pasadena, Calif., USA). The particle solids were 2.5% (w/w) in water. Polysaccharide deposition aids were covalently grafted to the particles using the following protocol:

Step 1—Synthesis of Melamine Formaldehyde Pre-Polymer

To a 20 ml vial was added 3.9 g formalin (37% w/w aqueous formaldehyde) and 8.8 g water. The pH of the solution was adjusted to 9.0 using 5% (w/w) aqueous sodium carbonate. 2 g of melamine and 0.13 g of sodium chloride were added. The mixture was heated to 65° C. and shaken at 150 rpm, using a shaker water bath (Haake SWB25), until it became clear. The resultant pre-polymer consisted of 23.2% (w/w) of trimethyloyl melamine in water and was used within 1 hour of production.

Step 2—Polysaccharide Grafting Via Secondary Melamine Formaldehyde Shell Formation 1% (w/w) aqueous solutions of the polysaccharides were pre-prepared. Xyloglucan was dissolved in hot water by homogenising (IKA T18 Ultra-Turrax) for 5 minutes at 8,000 rpm. The pectin was dissolved in cold water by simply shaking overnight (VWR Standard 5000 Analog Orbital Shaker at speed setting #4). The following polysaccharides were used:

Xyloglucan from Tamarind Kernel Gum (molecular weight 880 kDa, available under the trade name Glyloid 3S from DSP Gokyo)

Pectin (molecular weight range not determined, Sigma Aldrich, Cat #P9436)

To a 20 ml vial was added 9.3 g of the red fluorescent particles, 1.2 g of the 1% (w/w) polysaccharide solution and 1.5 g of water. The vial was sealed and agitated on a roller mixer (Stuart SRT9) for 15 mins. Then 0.031 g (31 µl) of the melamine formaldehyde pre-polymer (from step 1) was added and the pH adjusted to 4.0 using 10% (w/w) formic acid aqueous solution. The vial was re-sealed and then shaken (150 rpm) in a water shaker bath (Haake SWB25) at 40° C. for 20 hours. The particles were then cleaned by centrifuging at 11,000 rpm for 15 minutes (Eppendorf Centrifuge 5804 R), decanting supernatant and redispersing using a vortex mixer in 10 ml of deionised water (VWR Pulsing Vortex Mixer) at 2,500 rpm for 5 minutes. This cleaning procedure was repeated a further two times.

The final material consisted of polysaccharide grafted particles dispersed in water. Their solid content was determined using a moisture balance (Ohaus MB45) at 105° C. to constant weight (Table 1).

TABLE 1

Solids Content of Polysaccharide Grafted Particles

| Grafted Polysaccharide | Solids (% w/w) |
| --- | --- |
| Xyloglucan | 1.3 |
| Pectin | 1.7 |

A control particle was prepared by repeating the melamine-formaldehyde coating process but in the absence of any polysaccharide.

In each case the melamine-formaldehyde shell was added at 3% on weight of the underlying poly(styrene) core particle and the polysaccharide at 5% on weight of the underlying poly(styrene) core particle.

Particle Deposition to Microbial Biofilms

A microbial biofilm was grown from a wild type *Pseudomonas aeruginosa* PA01 strain isolated from a domestic washing machine in BioFlux 200 system (Fluxion Biosciences Inc., South San Francisco, Calif.) using 48-well (24 channel) microfluidic flow device microplates. The microfluidic channels (depth, 75 μm; width, 350 μm) were primed with tryptone soya broth (TSB) at a pressure of 5.0 dyn/cm². Channels were seeded with $10^7$ colony forming units (CFU) bacterial culture from an overnight culture of *P. aeruginosa* PA01. The plate was then incubated at 30° C. for 2 hours to allow cells to adhere. After the initial adhesion phase, a shear flow profile was applied to each channel. Nutrients were replenished after 24 hours of growth.

After biofilms had formed, planktonic cells and poorly adhering biofilm were removed by rinsing at a pressure of 2.5 dyn/cm² for 5 minutes with a phosphate buffered saline (PBS) model electrolyte solution. The composition of the PBS was 8 g/litre sodium chloride, 0.2 g/litre potassium chloride, 1.44% di-sodium hydrogen orthophosphate and 0.24 g/litre of potassium di-hydrogen orthophosphate.

Particle deposition to and retention on the biofilm after rinsing were compared as follows: The fluorescent particles were dispersed in the PBS at a concentration of 0.0025% w/v solids.

The particle suspensions were flowed through the biofilm filled microfluidic channels for 2.5 minutes in one direction and then 2.5 minutes in the opposite direction at a constant pressure of 5 dyn/cm². The biofilm filled channel was then rinsed with PBS in the absence of particles for 2.5 minutes in one direction and 2.5 minutes in the opposite direction.

The number of particles retained within the biofilm filled channel after the final rinse was determined by fluorescence imaging using the EVOS FL cell imaging system at 530 nm excitation and 593 nm emission. The fluorescence for each channel was measured over set dimensions across the main viewing region of the plate.

The mean fluorescence values, based on a minimum of five deposition experiments for each particle, are listed in Table 2 and compared with those for the control particle with a melamine-formaldehyde coating, but no polysaccharide deposition aid.

TABLE 2

Deposition (post-rinse retention) of melamine-formaldehyde coated fluorescent microcapsules to a microbial biofilm in a Bioflux microfluidic channel

| Polysaccharide Deposition Aid | Fluorescence (AU) Mean | Standard deviation | Number of measurements (n) |
|---|---|---|---|
| None (control) | 2.98 | 1.35 | 5 |
| Pectin | 3.49 | 1.31 | 5 |
| Xyloglucan | 9.00 | 3.40 | 5 |

The fluorescence results demonstrate that the microcapsules covalently grafted with the nonionic xyloglucan are retained significantly more efficiently on the biofilm following the simulated rinsing process than the melamine-formaldehyde (MF) coated control microcapsules and the anionic pectin polysaccharide. This increase in deposition efficiency will deliver and retain higher concentrations of biofilm control agent actives in the microcapsule to the biofilm throughout the laundry cycle.

The invention claimed is:

1. A biofilm targeting microcapsule, suitable for deposition onto a biofilm from an aqueous dispersion, comprising: a solid microparticle with average diameter from 1 to 100 micron, the microparticle carrying a non-volatile functional material to be delivered to the biofilm after the microparticle has been deposited onto the biofilm,
   wherein the microparticle has attached to its outer surface from 0.5 to 5 wt %, based on the microparticle weight, of nonionic polysaccharide polymer,
   wherein the nonionic polysaccharide polymer is covalently attached to the outer surface of the microparticle,
   wherein the nonionic polysaccharide polymer is selected from the group consisting of β-1,3-polysaccharides comprising one or more of scleroglucan, schizophyllan, laminarin and mixtures thereof.

2. The microcapsule according to claim 1 wherein the molecular weight of the nonionic polysaccharide polymer falls in the range 40 kDa to 1 MDa.

3. The microcapsule according to claim 1 wherein the microparticle is a matrix microparticle.

4. The microcapsule according to claim 3 wherein the matrix microparticle is selected from synthetic polymer latex microparticles and swellable silica microparticles.

5. The microcapsule according to claim 1 wherein the average diameter of the microcapsule lies in the range 1 to 50 micron.

6. The microcapsule according to claim 1 wherein the functional material is a biofilm control agent.

7. The microcapsule according to claim 6 wherein the biofilm control agent is water-soluble, or essentially water-insoluble, but oil soluble.

8. The microcapsule according to claim 6 wherein the biofilm control agent is an antimicrobial active designed to kill or inhibit microbial growth, or a biofilm dispersing agent, or a quorum sensing inhibitor, or mixtures of materials having one or more of these functions.

9. The microcapsule according to claim 8 wherein the biofilm control agent is selected from the following classes of antimicrobial agents and mixtures thereof:
   (i) Quaternary ammonium compounds (QACs), selected from the group consisting of benzalkonium chlorides, mono-alkyl trimethyl ammonium salts, di(C6C14)alkyl di-C1-4 alkyl or alkyl/hydroxyalkyl quaternaries and cetylpyridinium chloride,
   (ii) Biguanide compounds, selected from the group comprising: 1,1'hexamethylene bis(5-(p-chlorophenyl) biguanide), poly(hexamethylene biguanide) hydrochloride and poly(hexamethylene biguanide) stearate,
   (iii) Phenols, selected from the group comprising: ortho-phenylphenol, 2,4,4'-trichloro-2'-hydroxy-diphenyl ether, 4-4' dichloro-2-hydroxy diphenyl ether, para-chloro-meta-xylenol, thymol, and chlorothymol, and
   (iv) Fungicidal and fungistatic actives selected from climbazole, ketoconazole, and zinc pyrithione.

10. A method of delivering a non-volatile functional material to a biofilm comprising the steps of:
   a) forming an aqueous dispersion of microcapsules according to claim 1, and
   b) flowing the aqueous dispersion across the biofilm for a time of from 3 seconds to 30 minutes, thereby to bring the microcapsules into contact with the biofilm and to leave them adhered to the biofilm.

* * * * *